United States Patent [19]

Shaffer et al.

[11] Patent Number: 5,943,410
[45] Date of Patent: Aug. 24, 1999

[54] AUTOMATED CALLING OF MULTIPLE NUMBERS USING DIRECTORY ASSISTANCE

[75] Inventors: Shmuel Shaffer, Palo Alto; William J. Beyda, Cupertino; Cheryl Gold, Palo Alto; Jay Thomas, Los Altos, all of Calif.

[73] Assignee: Siemens Information and Communications Networks, Inc., Boca Raton, Fla.

[21] Appl. No.: 08/691,833

[22] Filed: Aug. 2, 1996

[51] Int. Cl.⁶ .................................................. H04M 3/46
[52] U.S. Cl. .............................................. 379/213; 379/355
[58] Field of Search ................................. 379/67, 88, 89, 379/201, 210, 211, 212, 213, 214, 216, 218, 354, 355, 356, 387, 88.16, 67.1; 395/2.79, 2.81; 704/270, 272

[56] References Cited

U.S. PATENT DOCUMENTS

| | | | |
|---|---|---|---|
| 4,930,152 | 5/1990 | Miller | 379/214 |
| 4,979,206 | 12/1990 | Padden et al. | 379/67 |
| 5,204,894 | 4/1993 | Darden | 379/88 |
| 5,297,195 | 3/1994 | Thorne et al. | 379/93 |
| 5,343,518 | 8/1994 | Kneipp | 379/355 |
| 5,430,792 | 7/1995 | Jesurum et al. | 379/67 |
| 5,475,748 | 12/1995 | Jones | 379/211 |
| 5,559,867 | 9/1996 | Langsenkamp et al. | 379/69 |
| 5,677,949 | 10/1997 | Macor | 379/355 X |
| 5,764,731 | 6/1998 | Yablon | 379/355 X |

OTHER PUBLICATIONS

"Mehtod for Performing Phone Call to Unknown Callees", IBM Technical Disclosure Bulletin, vol. 36.36, No. 10, pp. 605, 1993.

*Primary Examiner*—Scott Weaver

[57] ABSTRACT

An apparatus and method allow a telephone user to be automatically connected, in sequence, to multiple telephone numbers in response to a single directory assistance query. The user can elect to put all numbers retrieved by his request into a queue, or can queue a subset. The user can further elect to be connected to all numbers in the queue, or can dial some and skip some. An analogous apparatus and method allow a user connected to the internet to navigate by voice interaction through queued site-visit options.

10 Claims, 8 Drawing Sheets

AUTOMATED CALLING OF MULTIPLE NUMBERS USING DIRECTORY ASSISTANCE

FIELD OF THE INVENTION

This invention relates to methods and systems for using directory assistance inquiries. More generally, it relates to voice navigation through queued options using voice response units.

BACKGROUND OF THE INVENTION

Directory assistance inquiries in modern telecommunications networks are commonly handled by transferring the caller to a voice response unit that plays the phone number audibly. In many instances, as for example when a shopper wants to call several retail establishments in order to compare services, a user may ask for several numbers in the same inquiry. When a user inquires for more than one number, sometimes a human operator reports all numbers. In other areas, the human operator reports all but the last of the numbers; the last number is then played on a voice response unit.

If a user is prepared with pen and paper, may be able to write down the list of numbers. However, transcription errors are common; when a transcription error occurs, the user must start over, calling directory assistance again. Furthermore, manual dialing of the number increases the likelihood of errors. Even if the user has the correct number, he does not always succeed in dialing it.

Any suboptimal condition greatly increases the chances for error. If a user does not have pen and paper, or is distracted, it is extremely difficult to remember the numbers given. For example, someone who is using the cellular telephone in his car in difficult traffic conditions may be unable to remember even a single number, let alone more than one. The attempt to do so may distract from his driving. In any event, dialing incorrect parties and having to call directory assistance again is inefficient and costly.

In some areas, the user has the option to automatically connect to the last number given, if it is given by a VRU. However, this option is only marginally useful when the user wants to call more than one number. What is needed is a system to simplify the handling of multiple calls.

SUMMARY OF THE INVENTION

An apparatus and method allow the user to be automatically connected, in sequence, to multiple telephone numbers in response to a single directory assistance query. Multiple telephone numbers can be queued. The user can elect to put all numbers retrieved by his request into a queue, or can queue a subset. The user can further elect to be connected to all numbers in the queue, or can dial some and skip some.

An analogous apparatus and method allow a user connected to the internet to navigate by voice interaction through queued site-visit options.

DESCRIPTION OF THE PREFERRED EMBODIMENTS

Figure 1:
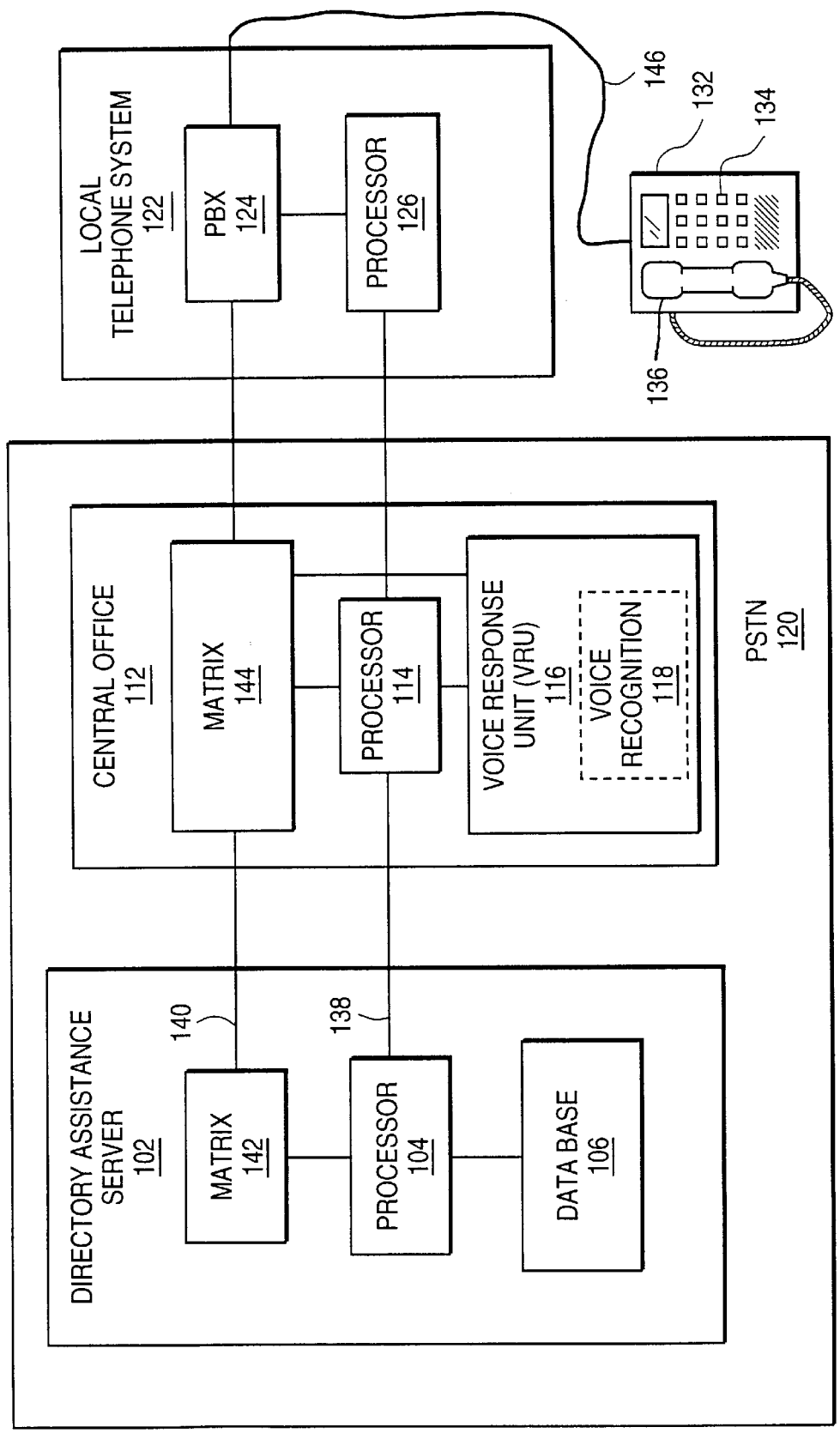
FIG. 1 is a schematic block diagram of the apparatus used in the present invention.

A telephone system 100 of the present invention is shown in FIG. 1. A directory assistance server 102 includes a processor 104 that accesses a data base 106. Data base 106 includes telephone numbers and other data to be queried by a user.

Directory assistance server 102 communicates with a central office 112. Central office 112 includes a processor 114 and a VRU 116. VRU 116 also includes a voice recognition unit 118. In the preferred embodiment, separate voice link 140 connects a matrix 142 in directory assistance server 102 with a matrix 144 of central office 112 and a private branch exchange (PBX) 124 of local telephone system 122, as schematically illustrated in FIG. 1. A dedicated data link 138 connects processors 104, 114, and a processor 126 of local telephone system 122. In FIG. 1, data links are indicated by 1 pt. lines between tile designated elements, voice links are indicated by 2 pt. lines between designated elements.

Directory assistance server 102 and central office 112 are part of a public switched telephone network (PSTN) 120. Local telephone system 122 includes a processor 126 in addition to PBX 124. A voice link 146 connects local telephone system 122 to a telephone 132 that includes a keypad 134 and a handset 136.

Figure 2:
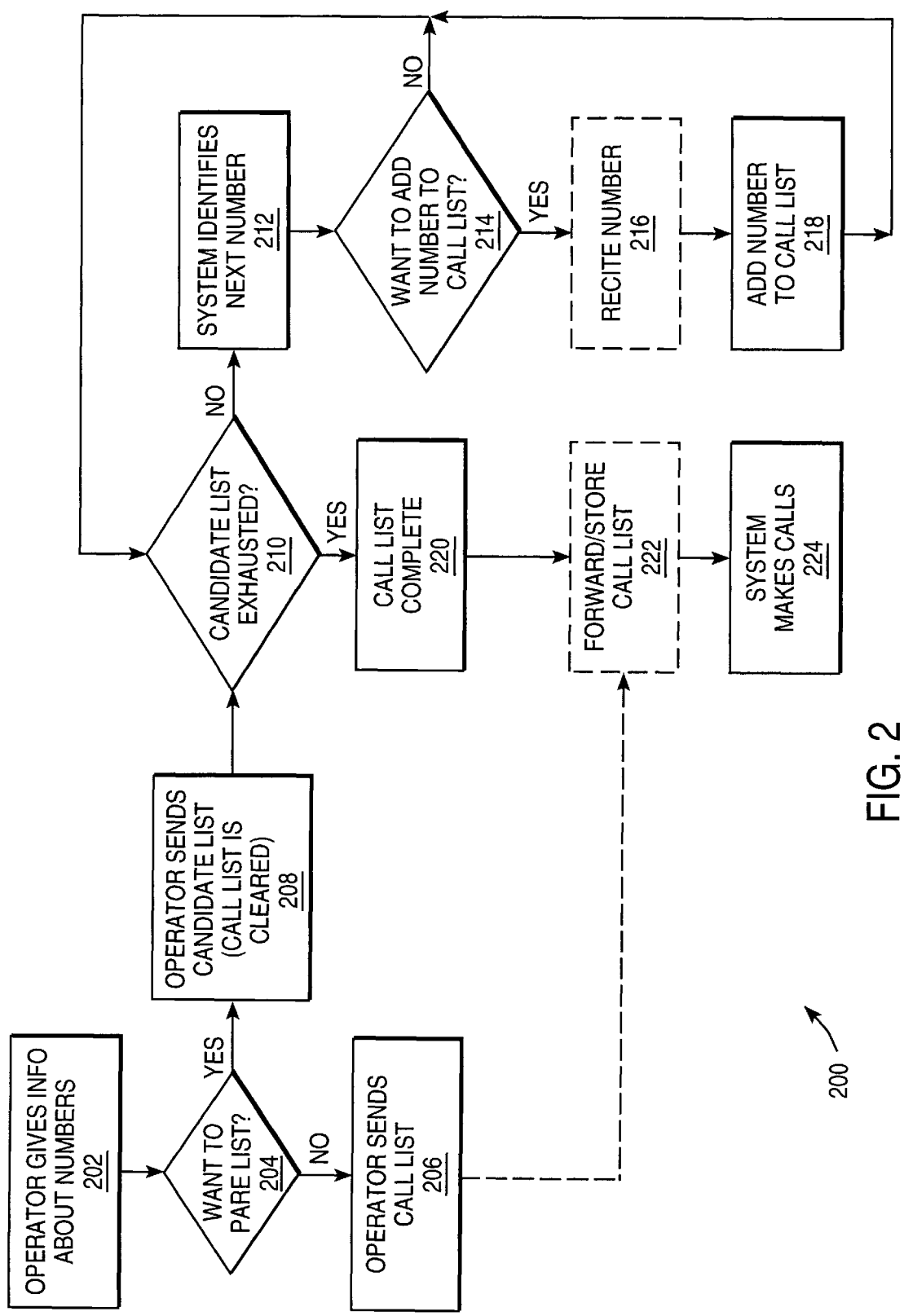
FIG. 2 illustrates steps of a method in accordance with the present invention.

In a method for use with the above system, a list of candidate telephone numbers can be pared to produce a list of numbers to be automatically dialed. In a method 200 according to the preferred embodiment, a user dials directory assistance and inquires for a name, as schematically shown in FIG. 2. For example, the user may inquire for Orchard Supply Hardware stores. An operator looks up the numbers and, at a step 202 says, "I have two in San Jose, one in Cupertino, one in Los Gatos, and one in Santa Clara." The user decides, at a step 204, whether he wishes to use the entire list of numbers or whether he wants to pare down the list. If the user wishes to use the entire list, he has the operator send the call list, at a step 206. The user may then optionally forward or store the list, as indicated by the dashed line from step 206 to step 222, or proceed directly to using the system to make calls (step 224). The steps of placing the calls will be discussed at greater length later.

In the preferred embodiment, list management takes place in processor 114 of central office 112. If the user wishes to pare the list, an operator forwards a candidate list to processor 114, at a step 208. The candidate list may comprise tile entire original list, or may be a proper subset of it. For example, the user could say "I'll take the numbers in San Jose, Santa Clara, and Cupertino."

The central office is local to the caller, if list management occurs there, then fewer lines to the directory assistance server are tied up for extended times. Also, list management at the central office enables individual (non-PBX) subscribers to use it without needing to associate computers or processors with home telephones.

In alternative embodiments, the complete list could be forwarded by the operator and managed within a processor within a PBX or a processor connected to an individual telephone, as for example, within a home computer connected to a telephone subscriber's telephone. Alternatively, the complete list could be forwarded by the operator and managed by the processor and VRU within directory assistance server 102 for the initial subset selection. However, in the preferred embodiment, initial selection is performed with the help of an operator, because in a complex selection environment, human interaction is the most efficient way to establish an appropriately narrowed starting list of numbers. In alternative embodiments, the entire process, beginning with the retrieval of the complete list, can take place with the user making selections to the system without an operator.

As described below, the list management method occurs as a routine in a processor. The processor managing the list can be directory assistance server processor 104, central office processor 114, or another processor in PSTN 120. Alternatively, the list management can occur in local telephone system processor 126, or can occur in a processor in telephone 132 or in a computer associated with telephone 132. For voice-activated list management, the directory assistance server, PBX, or home computer/telephone system would require a voice response and/or voice recognition unit.

Once the candidate list is forwarded to a processor, the method proceeds according to the following steps. The method is controlled by a routine in the processor. A step 210 checks whether the entries in the candidate list have been exhausted. In the first arrival at step 210, the list has just been forwarded from the operator, so the answer is "NO". The method then proceeds to a step 212, where the system supplies an identifier for the next number. Preferably, the identifier is supplied by a VRU, although it can also be supplied on a display such as a CRT screen, LCD display or LED display.

In a preferred embodiment, the supplied identifier includes additional usable information, such as a street address or person's first name, that assists the user in deciding whether to include the number in a his call list. Alternatively, the supplied identifier simply distinguishes a number from the others (e.g., "The first number . . . ") or recites the number itself.

For example, a VRU may say, "Orchard Supply #86 is located at 1521 San Carlos Street, San Jose." The user then decides, at a step 214, whether to add the entry to the call list. In the preferred embodiment, the decision is indicated by a voice response to the VRU. In alternative embodiments, the decision can be indicated through a keyboard keystroke or keypad entry. For example, the user might press the star key to skip the entry or the pound key to add it to his list.

If the user says "NO", the method loops back to step 210, where it rechecks whether the candidate list is exhausted. If the user says "YES", the number is first added to the call list, at a step 218. Alternatively, the VRU may recite the number to allow the user to write it down, at optional step 216, before the number is added to the call list at step 218. After the number is added to the list, the method returns to step 210.

When the candidate list is exhausted (i.e., the user has decided whether to add each candidate number to the call list), the call list is complete, as indicated at step 220. At an optional step 222, the call list can be forwarded to another telephone or stored for further reference. The method proceeds to a step 224, at which the calls are made.

Figure 3:
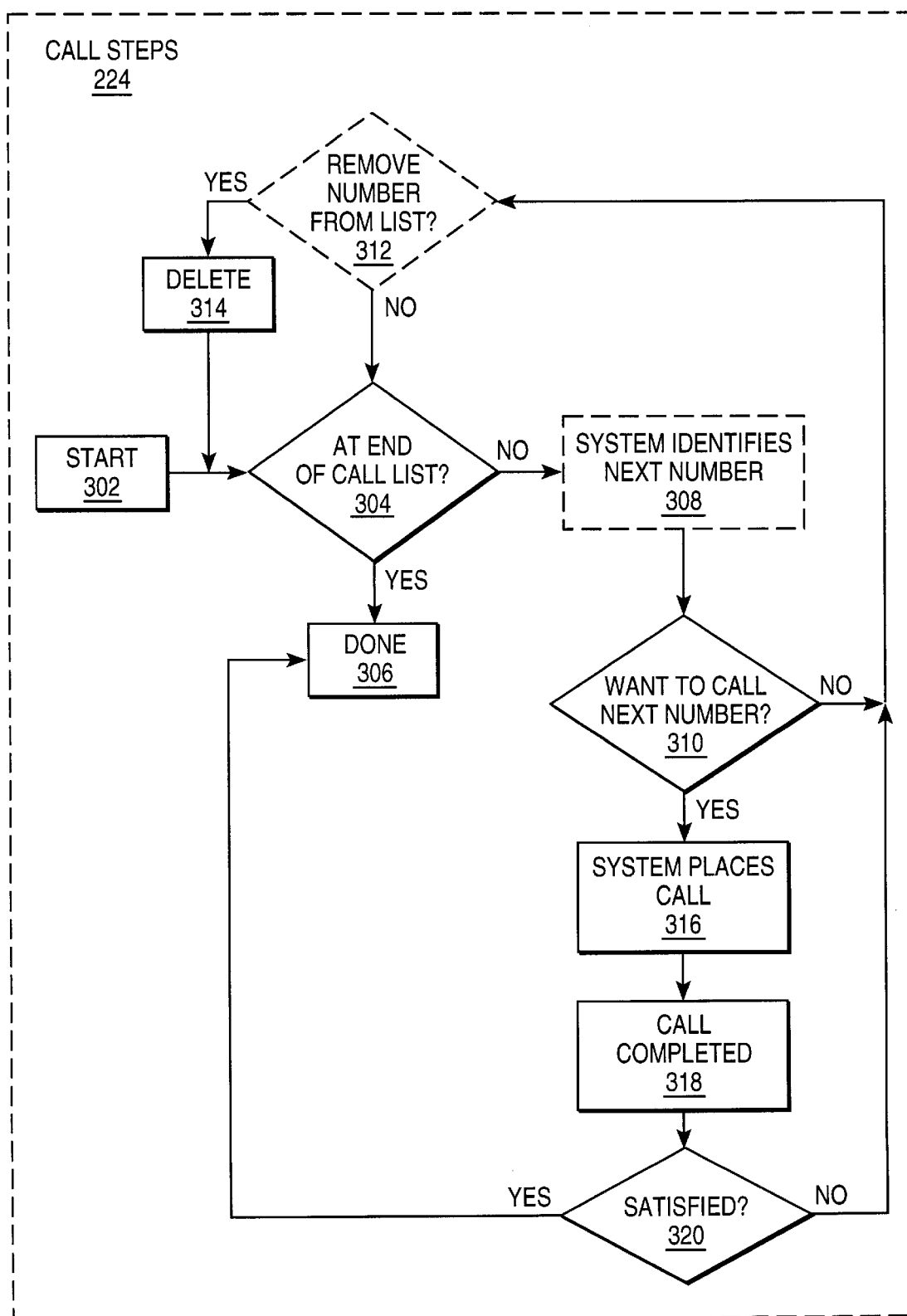
FIG. 3 illustrates substeps of a step of the method of FIG. 2, generally showing substeps used to make the calls in the method of FIG. 2.

The substeps of step 224 are indicated in FIG. 3. The method starts at a substep 302. At a substep 304, it is determined whether the system is at the end of the list of entries to call. If yes, the method is finished, as indicated at a step 306.

If the system is not at the end of the list, as indicated by a "NO" response to question 304, the method proceeds to the next substep. An optional substep 308 supplies information about the next number. Otherwise, the method proceeds to a substep 310, which asks the user whether he wishes to call the next number. If not, at an optional substep 312, the system asks the user whether to remove the number from the list. If the user says "YES" in response to 312, the number is deleted at a step 314. Otherwise, the method returns to substep 304, and rechecks whether the end of the list has been reached. If not, the method proceeds again to steps 308 and 310.

If, in this case, the user wants to call the next number, as indicated by a "YES" answer to 310, the method proceeds to a substep 316. In substep 316, the system calls the number.

At a substep 318, the call is completed. The method then continues to a substep 320, wherein the system, preferably the VRU, asks if the user is satisfied. Alternatively, the query can be initiated by computer display, by a series of telephone tones, or by a human operator. The user indicates whether he is satisfied, by saying "YES" or "NO", or by using a keyboard or keypad.

If the user is satisfied, the method proceeds to step 306 ("DONE"), and the method is completed. If the user is not satisfied, the method proceeds to optional substep 312 or to substep 304, where it again checks whether the end of the list has been reached. The method iterates substeps 304–320 until the user is satisfied or the end of the list has been reached.

Figure 4:
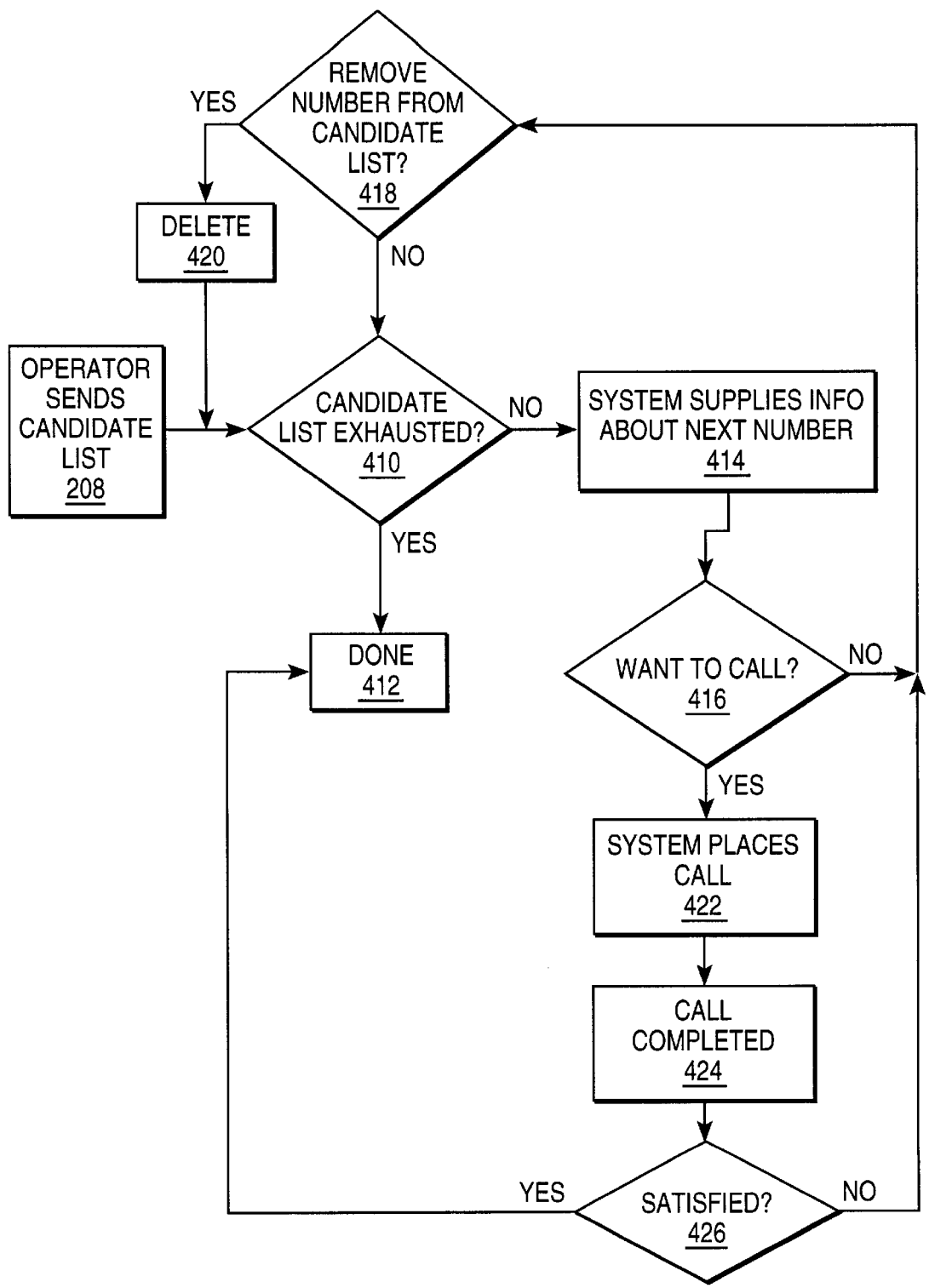
FIG. 4 illustrates an alternative embodiment of the method of FIG. 2, in which the call list is updated according to information learned while placing calls.

In an alternative method, the user updates his candidate list based on information received in calls to numbers on that list, as shown in FIG. 4. In this alternative, steps 202–208 occur as shown in FIG. 2. The method proceeds from step 208 to a step 410, which determines whether the entries in the candidate list have been exhausted, analogously to step 210. If yes, the method is done, as shown in step 412. If the candidate list is not exhausted, the method proceeds to a step 414, in which the system supplies information about the next number. The system then asks, at a step 416, whether the user wants to call the number. As above, the question can be asked by a VRU, by display on a screen or LED or LCD display, or can be a prompt indicated, for example, by a tone. If the user decides not to call, the system inquires at a step 418 whether to remove the number from the candidate list. Again, the question can be indicated by VRU, display or prompt. If the user responds "YES", the number is deleted at a step 420. If not, the method returns to step 410 and again checks whether the candidate list has been exhausted.

If, in response to the inquiry at step 416, the user wishes to call the number, the method proceeds to step 422, and the system places the call. The call is over, at a step 424. At a step 426, the system inquires whether the user is satisfied—again preferably by VRU but alternatively by display. If yes, the method is completed. If no, the method returns to step 418, and the user is again asked whether to keep the number on the list for a future call. This might occur if, for example, the number is busy or if the user has reached a store that must check on its inventory before providing an answer. Steps 410–426 are iterated until the user is satisfied or the candidate list is exhausted.

Alternatively, the information provided by the directory assistance server need not be by name of the subscriber. Inquiries can be made and information provided according to other categories. For example, a "yellow pages"-type inquiry might request all listings for glass fishtank merchants within a directory. Lists could be pared geographically, as for example a request for listings of orthodontists in Santa Clara, service stations on Peachtree Avenue, or dry cleaners within a radius of the caller. Listings can also be pared by telephone tariff, so that the user eliminates distant or inconvenient stores.

Selection of the calling list can be after the entire candidate list has been recited, or a candidate can be selected after its particular listing is recited. Interrupt keys or voice instructions can be used if a large number of telephone numbers are retrieved. Similarly, either the user or the directory assistance server can designate a cutoff number of listings. If the number of matched listings exceeds this number, a refinement of search criteria will be requested.

Figure 5:
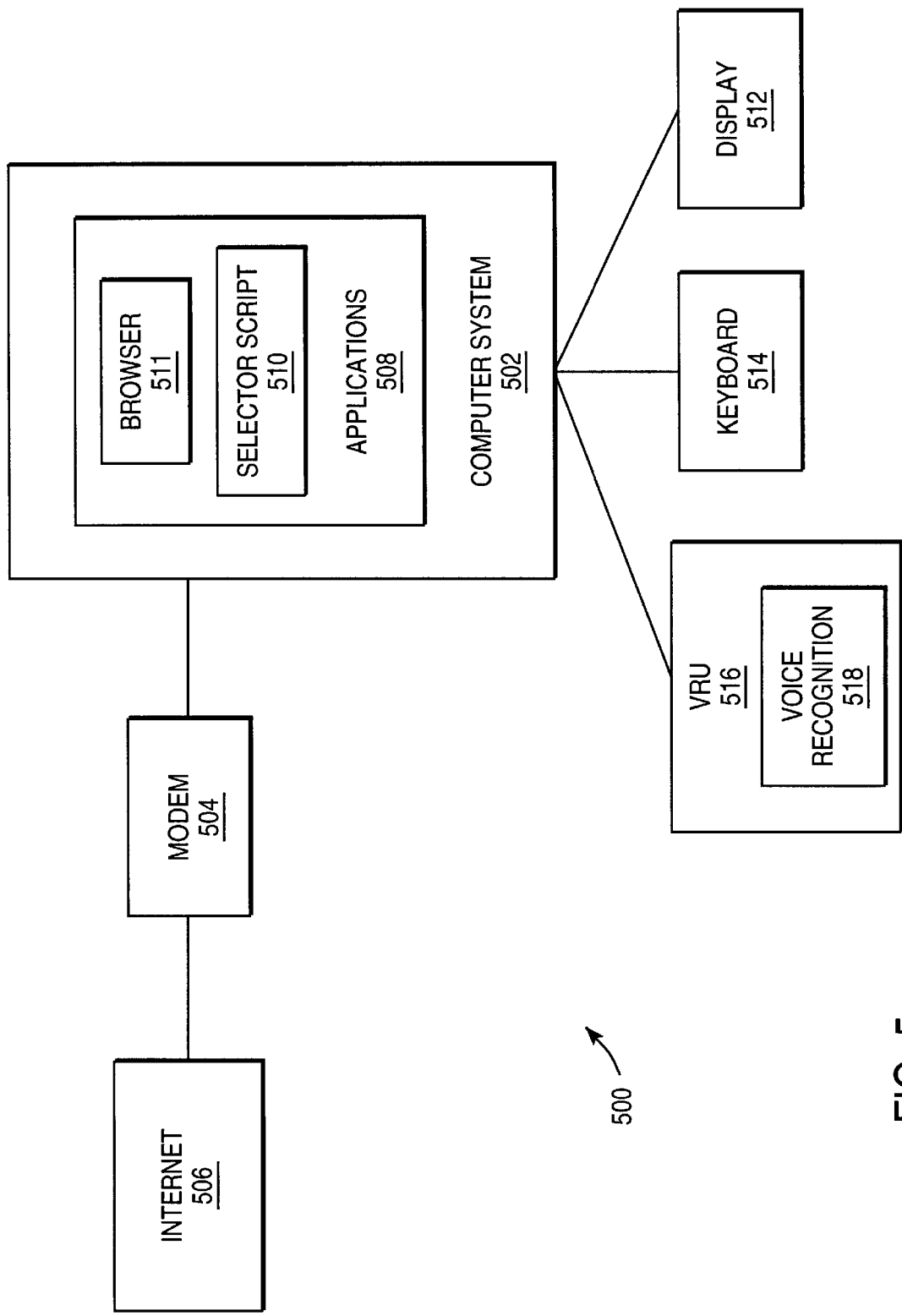
FIG. 5 is a schematic block diagram illustrating an apparatus of the present invention for use on the internet.

A system 500 for use on the Internet is shown in FIG. 5. A computer system 502 connects via a modem 504 to the internet 506. Computer system 502 runs applications 508 including a selector script 510 and a browser 511.

Computer system 502 also connects to a display 512, such as a CRT screen; a keyboard 514, and a voice response unit 516 that includes a voice recognition unit 518.

Figure 6:
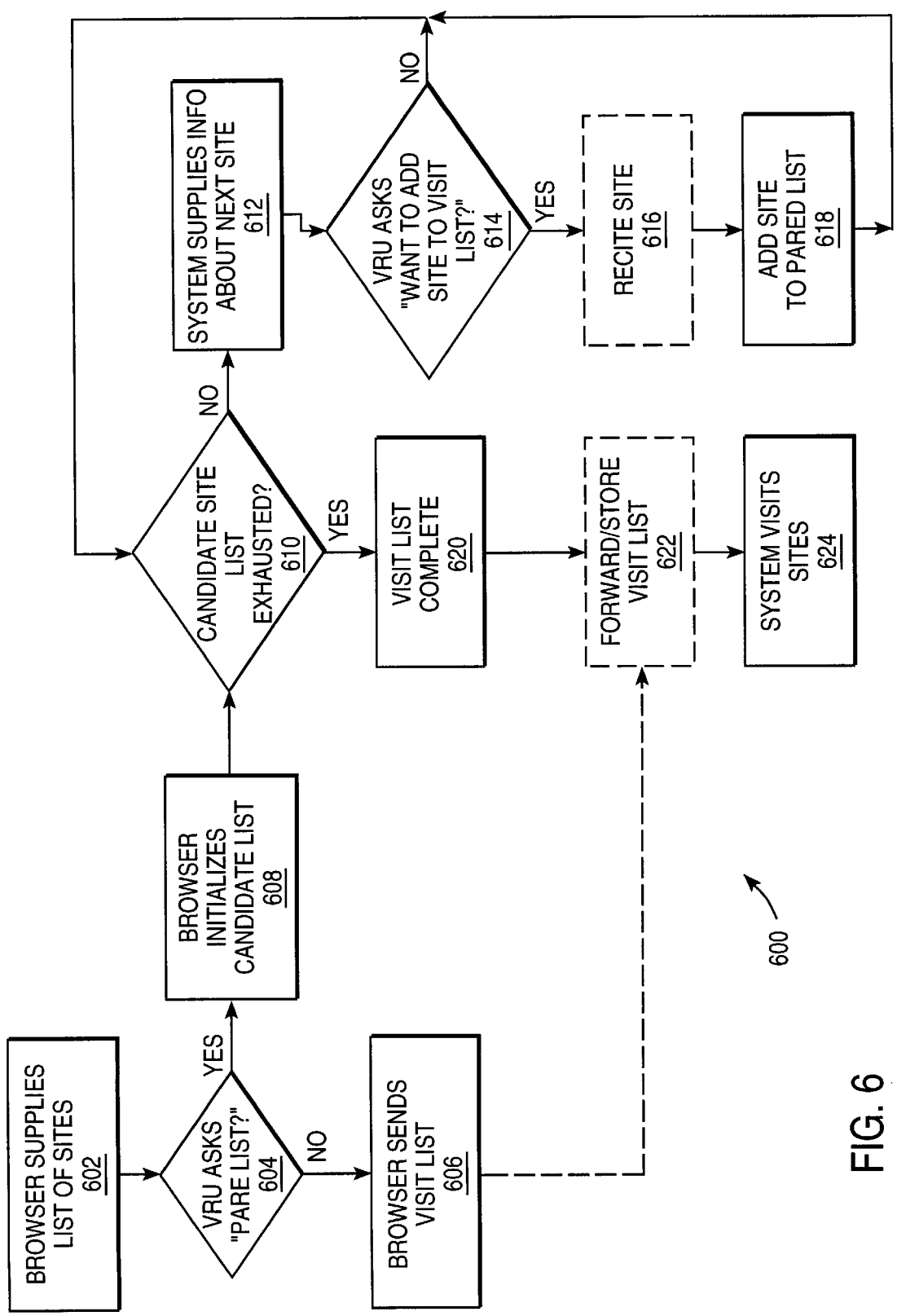
FIG. 6 is a method in accordance with the present invention showing the use of VRU navigation on the internet.

A method 600 in accordance with the present invention is shown in FIG. 6. A user inquires about web sites. At a step 602, a browser supplies a list of sites, e.g., in response to a voice search request or saved from a previous session. In the preferred embodiment, the sites are displayed on a CRT screen, although they can be recited. At a step 604, a VRU asks, "Do you wish to pare the list?" The user indicates his response, preferably by voice. If the user responds "NO," the browser supplies the initial list as the visit list. The user can then elect to have the system store and/or forward the list of sites, as indicated by the dotted line from step 606 to an optional step 622, can have the system visit the sites automatically at a step 624.

If the user responds "YES" to the question of step 604, the browser uses the supplied sites to initialize a candidate list of sites to visit, at a step 608. At a step 610, a selector script checks to see whether the site list is exhausted. If not, the method proceeds to a step 612.

At step 612, the system supplies information about the next site. The information is preferably supplied by display on a CRT, but may be displayed by another means, such as LED or LCD, or may be recited by VRU. At a step 614, a VRU asks the user if he wants to add the site to his visit list. The user preferably indicates his response orally.

If the user responds "NO", the method returns to step 610. If the user responds "YES", the method proceeds. At an optional step 616, the site name is recited. The site is added to the visit list at a step 618. The method then returns to step 610, and steps 610–618 are iterated until the candidate list is exhausted.

When the candidate list is exhausted, the visit list is complete, as indicated at a step 620. The method proceeds to optional step 622. At optional step 622, the list can be stored for future use or can be forwarded to another computer. The method then proceeds to a step 624. In step 624, the system visits the sites.

Figure 7:
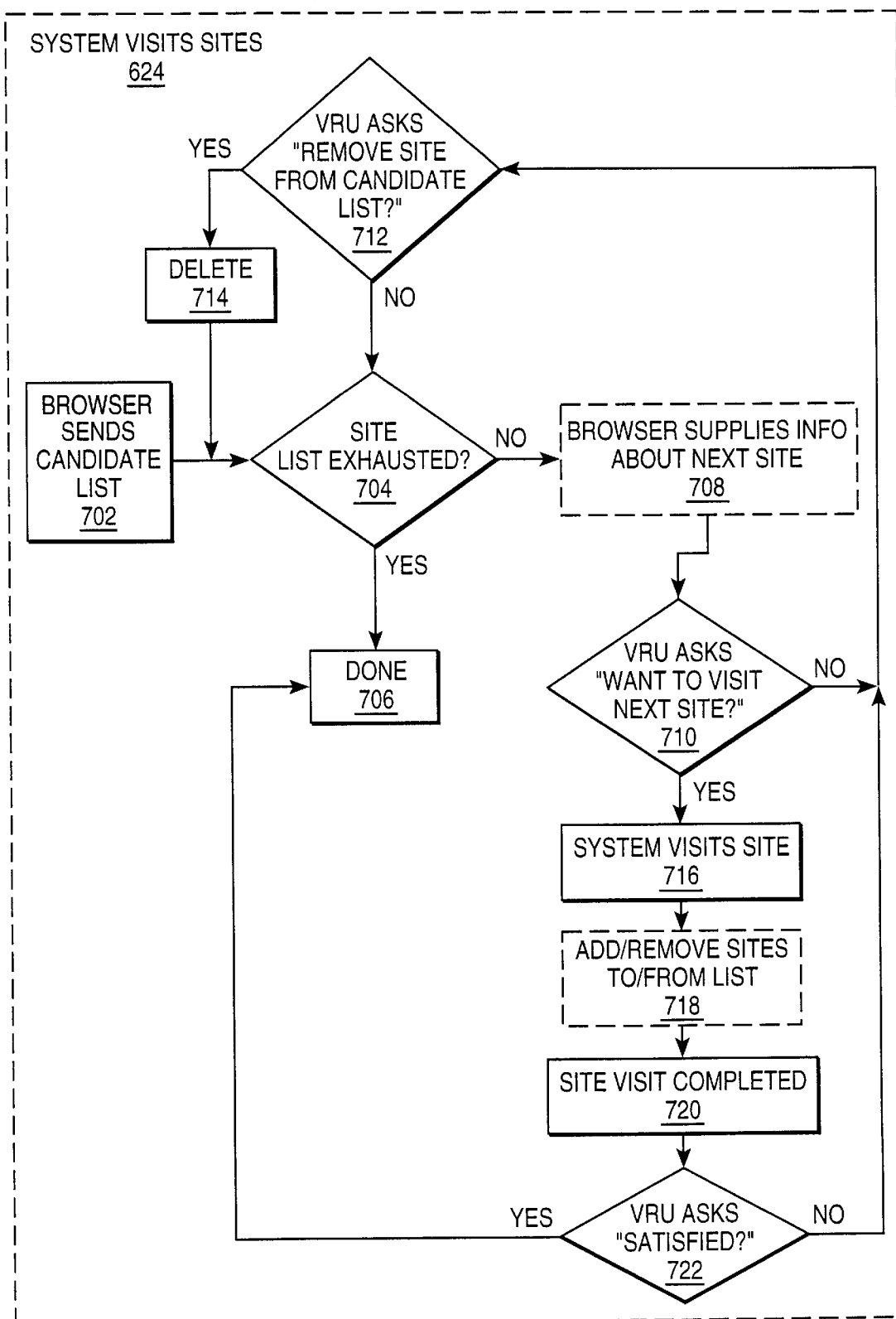
FIG. 7 illustrates substeps of a step of the method of FIG. 6, generally showing substeps used to visit sites in the method of FIG. 6.

The substeps of step 624 are illustrated in FIG. 7. The substeps start at 702. At a substep 704, it is determined whether the system is at the end of the list of sites to visit. If yes, the method is finished, as indicated at a step 706.

If the system is not at the end of the list, as indicated by a "NO" response to question 704, the method proceeds to the next substep. An optional substep 708 supplies further information about the next site. Otherwise, the method proceeds to a substep 710, which inquires of the user via a VRU whether he wishes to visit the next site. If not, the system can optionally inquire of the user whether he wishes to remove the site from the list, at a substep 712. If the user wishes to delete the site, the site is deleted at a step 714, and the method returns to step 704. If the user does not wish to delete the site, the method simply returns to substep 704, and rechecks whether the end of the list has been reached.

If the user wants to visit the next site, the method proceeds to a substep 716. In substep 716, the system visits the site. The user can select, at an optional substep 718, to add or remove new sites as the new sites are enountered in the current site visit. The site visit is completed at a substep 720. At a substep 722, the VRU asks the user if he is satisfied. If the user answers "NO", the method returns to substep 712 and iterates substeps 712–722 until the user is satisfied. When the user is satisfied, the method proceeds to substep 706, and is done.

Figure 8:
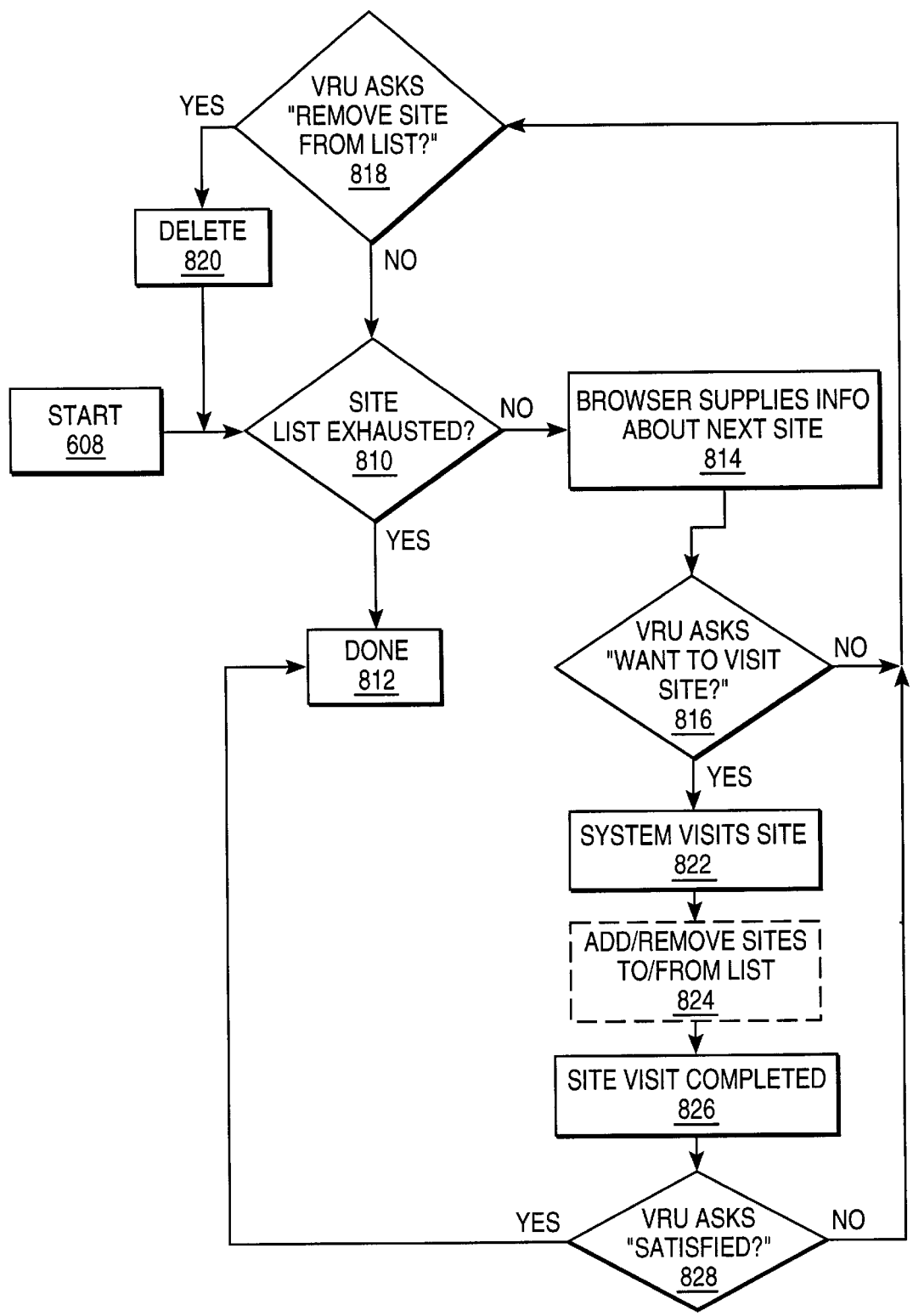
FIG. 8 illustrates an alternative embodiment of the method of FIG. 6, in which the visit list is updated according to information learned upon visiting sites.

Dynamic interaction with internet sites is shown in FIG. 8. In this alternative, the user updates his candidate list based on information received in visits to sites on that list. In this alternative, steps 602–608 occur as shown in FIG. 6. The method proceeds from step 608 to a step 810, which determines whether the entries in the candidate list have been exhausted, analogously to step 610. If yes, the method is done, as shown in step 812. If the candidate list is not exhausted, the method proceeds to a step 814, in which the system supplies information about the next site. The system then asks, at a step 816, whether the user wants to visit the site. As indicated above, the question can be by VRU, by display on a screen or LED or LCD display, or can be a prompt indicated, for example, by a tone. If the user decides not to visit, the system inquires whether the site should be removed from the candidate list, at a step 818. The question is preferably asked by a VRU. If the user indicates yes, the site is deleted at a step 820. If not, the method returns to step 810 and again determines whether the site list has been exhausted.

If, in response to the inquiry at step 816, the user wishes to visit the site, the method proceeds to step 822, and the system visits the site. At an optional step 824, the user adds or removes sites to or from his list during the visit. The site visit is completed, at a step 826. The system then inquires, again preferably by VRU, whether the user is satisfied, at a step 828. If yes, the method is completed and returns to step 812, and the method is done. If no, the method returns to step 818, and the user is again asked whether to keep the site on the list for a future visit. Steps 818–826 are iterated until the user is satisfied and the method is done.

In alternative embodiments, after the completion of each call or site visit, a decision can be made to save the steps of his search. A ring-back application can be used, where the system calls the user later with entries on the call or visit list. Retrieved numbers or sites can be connected to multiple telephones or computer sites at once so that a conference call can be established or multiple sites searched in parallel.

Integrated directory assistance/internet applications are provided for, such as where a user retrieves directory assistance listings from an internet provider. These and other modifications to and variations on the preferred embodiments are provided by the present invention, the scope of which is limited only by the following claims.

What is claimed is:

1. An apparatus for queuing plural telephone numbers to allow for a user of a telephone to connect automatically to said plural telephone numbers in sequence, comprising a directory assistance server including a data base of telephone numbers;

a telephone; and a data processor, said data processor supporting the selection of a subset of telephone numbers from said data base in response to search criteria set by the user to form a queue of plural telephone numbers and enabling said telephone to dial each of said plural telephone numbers in said queue in sequence without requiring further user intervention before dialing.

2. An apparatus as in claim 1 wherein said data processor is incorporated in a public switched telephone network.

3. An apparatus as in claim 1 wherein said data processor is incorporated in a central office of a public switched telephone network.

4. An apparatus as in claim 1 wherein said data processor is incorporated in a PBX.

5. An apparatus as in claim 1 wherein said data processor is incorporated in a computer connected to said telephone.

6. A system for dialing queued telephone numbers in sequence, comprising:

means for supplying, by a directory assistance server, a first telephone number and a second telephone number in response to search criteria set by a user;

means for queuing said first and said second telephone numbers;

means for dialing said first telephone number; and means for dialing said second telephone number after disconnecting with said first telephone number, without requiring further user intervention before dialing.

7. A method for forming a queue of telephone numbers in response to search criteria set by a user, said queue comprising a first telephone number and a second telephone number, to allow for automatic dialing of said first telephone number and said second telephone number sequentially, said method comprising the steps of:

supplying, by a directory assistance server, a first and a second telephone number;

adding said first number to said queue;

adding said second number to said queue;

dialing said first telephone number; and after said step of dialing said first telephone number, dialing said second telephone number without requiring further user intervention before dialing said first number and said second number.

8. A method for queuing telephone numbers to allow for automatic dialing in sequence, comprising the steps of (a) supplying, by an operator, a candidate list of plural telephone numbers in response to search criteria set by a user;

(b) deciding whether to pare the candidate list of plural telephone numbers;

(1) if the decision is not to pare the candidate list, proceeding directly to step (d), wherein the candidate list becomes a call list;

(c) if the decision is to pare the candidate list, selecting a proper subset of the candidate list to form a call list by performing the following substeps (1)–(3) on every telephone number on the candidate list:

(1) identifying, by the system, a candidate telephone number from the candidate list;

(2) deciding whether to add the candidate telephone number to a call list;

(3) if the decision is to add the candidate number, adding the candidate number to said call list;

(d) sending the call list to a processor for dialing telephone numbers on said call list without requiring further user intervention between calls.

9. A method for forming a queue of telephone numbers, said queue comprising a first telephone number and a second telephone number, to allow for automatic dialing of said first telephone number and said second telephone number sequentially, said method comprising the steps of:

in response to search criteria set by a user, supplying, by a directory assistance server, a first and a second telephone number;

identifying, by a voice response unit, said first telephone number;

deciding whether to add said first number to said queue;

identifying, by a voice response unit, said second telephone number;

deciding whether to add said second number to said queue; and after said second deciding step, dialing each number in the queue without requiring further user intervention between calls.

10. A method for sequentially calling telephone numbers in a queue of at least one telephone number, said method comprising the steps of:

(a) supplying, by a directory assistance server in response to search criteria set by a user, plural telephone numbers, and for each supplied telephone number, performing the following substeps:

(1) a voice response unit identifying the supplied telephone number; and (2) deciding whether to add the supplied telephone number to said queue;

(b) dialing each number in said queue without requiring further user intervention before dialing each number.

* * * * *